United States Patent [19]

Reddick

[11] Patent Number: 4,861,322

[45] Date of Patent: Aug. 29, 1989

[54] EMERGENCY DRIVE (FAN) BELT

[76] Inventor: Gary M. Reddick, 6729 W. Earl Dr., Phoenix, Ariz. 85033

[21] Appl. No.: 157,415

[22] Filed: Feb. 17, 1988

[51] Int. Cl.⁴ ................................................ F16G 7/04
[52] U.S. Cl. ..................................... 474/254; 24/31 B; 24/31 C; 24/31 V; 24/32; 24/306; 156/304.3; 156/494; 156/66; 428/61; 428/100; 474/255
[58] Field of Search ..................... 156/137, 139, 304.3, 156/494, 502; 474/253, 254, 255, 257; 24/31 B, 31 C, 31 V, 32, 38, 68 D, 306; 428/61, 100

[56] References Cited

U.S. PATENT DOCUMENTS

| 283,856 | 8/1883 | Box | 24/32 |
| 1,986,785 | 1/1935 | Argy | 24/31 V |
| 3,461,511 | 8/1969 | Perina | 24/31 V |
| 3,574,019 | 4/1971 | Girard | 156/66 |
| 3,574,898 | 4/1971 | Scott et al. | 24/32 |
| 4,596,540 | 6/1986 | F'Geppert | 474/254 |

Primary Examiner—Michael Wityshyn
Attorney, Agent, or Firm—James F. Duffy

[57] ABSTRACT

Apparatus and method for effecting temporary, emergency repairs of an engine when a drive belt breaks and repairs must be made under adverse conditions. Either a linear belt segment or a conventional endless belt may be utilized for the emergency repair. A coupling strip maintains terminal ends of the emergency replacement belt juxtaposed and in close proximity.

20 Claims, 1 Drawing Sheet

ΕΜERGENCY DRIVE (FAN) BELT

BACKGROUND

1. Field of the Invention

The invention relates to the field of emergency engine repairs. In particular the invention relates to the replacement of drive belts. Specifically, the invention relates to the use of a drive belt comprised of a linear segment having ends which are coupled together to effect belt replacement.

2. Prior Art

The replacement of an engine fan belt, or other drive belt, can be troublesome since displacement and adjustment of pulleys is often required and, frequently, other drive belts have to be removed and replaced in the course of replacing any one particular belt. As with most misfortunes, the loss of a drive belt while traveling is often compounded by existing circumstances. For example, it would seem, a belt never breaks except when the weather is too hot, too cold, or rainy. So too, a belt never seems to break except when the tools necessary to effect repairs are missing. Even those with the foresight to carry spare, replacement belts are plagued by such additional irritants.

The prior art is replete with responses to this problem. All employ a linear segment of belting with means for coupling the terminal ends of the belting so as to form an endless, drive belt. This arrangement permits threading the belting over and around pulleys without having to adjust pulleys or remove and replace other belts.

The means whereby the terminal ends of the belting are coupled together are determinative, in the inventor's opinion, of the commercial success of such emergency belt arrangements. At present, it is difficult, if not impossible to find such an emergency repair belt in an automotive supply store or the like. This may be because all of the prior art requires extensive manufacturing modifications to what is otherwise a standard, widely produced product: the drive belting itself.

To overcome such problems, the invention disclosed herein makes use of standard drive belting in its prefabricated embodiment; and it utilizes a standard, endless, drive belt for on-site installation of terminal end coupling means in an alternative embodiment.

SUMMARY OF THE INVENTION

The invention is disclosed and claimed as the method for making an emergency drive belt installation on an engine comprising the steps of:

(a) bonding a first mating type coupling element to a first terminal end of a linear segment of drive belting;

(b) bonding a second mating type coupling element to a second terminal end of the linear segment of drive belting;

(c) threading the linear segment of drive belt around the appropriate engine pulleys;

(d) drawing the first and second terminal ends of the linear segment together; and, (e) mating the first and the second coupling elements to maintain the first and second terminal ends in juxtaposition forming an endless drive belt.

Other steps of the method may comprise:

(f) cutting an available, endless drive belt to provide a linear segment having two terminal ends for use in steps (a) and (b).

(g) selecting the mating type coupling elements of steps (a) and (b) to be complementary fastening elements of a hook and loop fastening assembly.

(h) performing steps a (and b) at a commercial manufacturing facility. And, (i) performing steps a (and b) at the site of the emergency drive belt installation.

The invention is disclosed and claimed as the product of the practice of the methodology of the invention.

The invention is also disclosed as means for assembling an emergency drive belt and is shown as comprising a first mating type coupling element bondable to a first terminal end of a drive belt segment, and a second mating type coupling element bondable to a second terminal end of a drive belt segment. There is a bonding medium for bonding the first and second mating type coupling elements to first and second terminal ends, respectively, of a drive belt segment.

The first and the second mating type coupling elements comprise complementary mating elements of a hook and loop fastening assembly.

Alternative embodiments of the invention are disclosed as comprising a linear segment of drive belting having two terminal ends for bondable coupling to the first and second mating type coupling elements, or as a commercially available endless drive belt cut to provide two terminal ends for bondable coupling to the two coupling elements.

Also included is a tensioning tool for grasping and drawing each of the terminal ends of a drive belt segment into juxtaposition while the first and second mating coupling elements are matingly coupled.

DETAILS OF THE INVENTION

Figure 1:
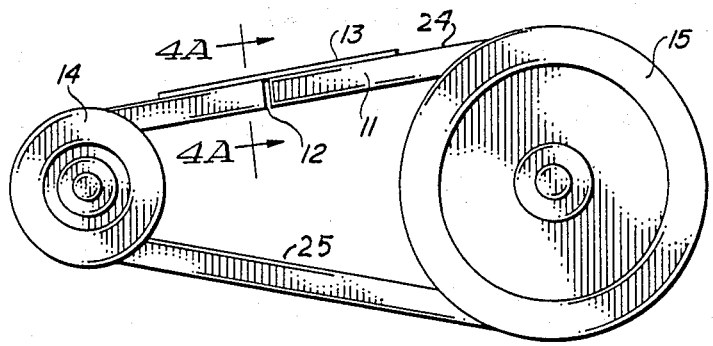
FIG. 1 illustrates the emergency fan belt in operative position coupling two pulleys.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention partains.

It is noted that the term "fan belt" is frequently used as a generic descriptor for any one of several drive belts used on or about an automobile engine. Such usage is preserved in this disclosure even though the invention is directly applicable to such drive belts as are used to couple fan, air conditioner, generator/converter, etc. to the power take-off of an automotive engine, or the like. The specification and claims shall be interpreted in light of this usage.

Figure 2:
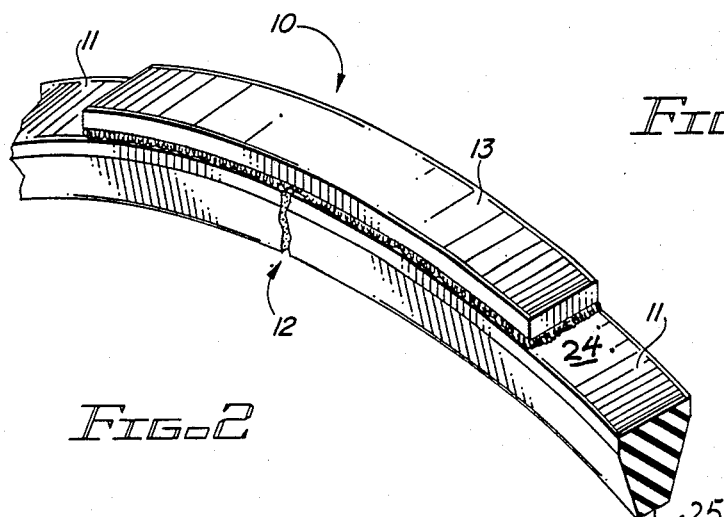
FIG. 2 is an enlarged detail of a portion of FIG. 1 showing the manner in which the terminal ends of the emergency fan belt are mechanically coupled.

FIG. 1, two pulleys, 14 and 15, are shown coupled by drive belt 11. Unlike the endless drive belts conventionally available at automotive supply stores, belt 11 has two terminal butt ends juxtaposed at 12; referred to herein as juxtaposition 12. The terminal butt ends are maintained at juxtaposition 12 by coupling strip 13, the application of which to the exterior surface 24 of belt 11 effectively makes belt 11 an endless drive belt. This arrangement is seen in greater detail in FIG. 2. Coupling strip 13 is a device which permits coupling and maintaining the terminal butt ends of belt 12 in juxtaposition without need to modify the basic manufacturing design and structure of belt 11. For purposes of exposition herein, coupling strip 13 is disclosed as a hook and loop fastener.

Figure 3:
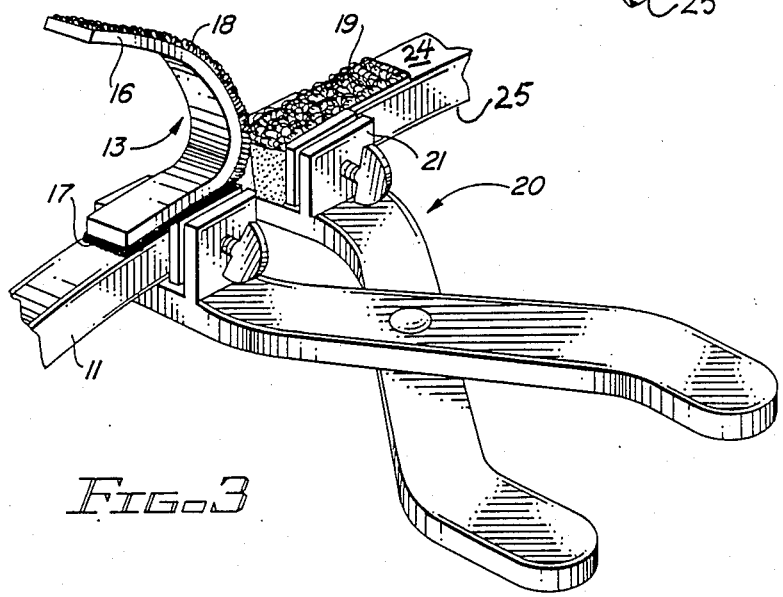
FIG. 3 shows the use of an optional tensioning tool used prior to coupling the terminal ends of the belt

In its hook and loop configuration, coupling strip 13 is shown in greater detail in FIG. 3. Coupling strip 13 is comprised of two fastening elements, 18 and 19. For example, fastening element 18 may be the "hook" element while 19 may be the "loop" element. Either a hook element or a loop element may be affixed to both terminal ends of belt 11. The complementary coupling element may then be freely separable from the belt and the affixed portions of the hook and loop fasteners.

In the drawings, element 19 has been illustrated, for consistancy only, as that element which is generally affixed to exterior surface 24 of belt 11. However, in the illustration of FIG. 3, both fastening elements 18 and 19 are tenaciously coupled to a high strength backing strip 16. Each is, in turn, adhered to surface 24 of belt 11 by bonding medium 17. Note: for clarity of depiction, backing strip 16 and bonding medium 17 are not shown under fastening element 19 in FIG. 2.

Hook and loop fasteners are available as a trademarked item using the mark Velcro. Velcro fasteners have displayed an almost ubiquitous presence as innovators find ever increasing uses for this form of quick, tough fastening device. Inquiries of manufacturers indicate the availability of high strength, hook and loop fasteners to meet the demands placed on coupling strip 13.

Bonding medium 17 may be any type bonding medium which will maintain fastening elements 18 and 19 affixed to belt 11 when the belt is emplaced on pulleys 14 and 15; the juxtaposition 12 of the terminal butt ends of belt 11 is established by coupling strip 13; and the belt is placed under load by operation of the pulleys (and the associated engine, not shown). One factor in determining the type of bonding medium to be utilized will be the situs at which coupling strip 13 is bonded to belt 11, i.e., at a commercial manufacturing facility or at the actual site at which the emergency drive belt will be utilized.

The invention conceives of the manufacture and sale of linear segments of drive belts 11 having fastening elements 18 and 19 affixed to adjacent respective terminal butt ends of the belt segments. See FIG. 3. Such a linear emergency drive belt would be stored handy to an automotive engine to effect a quick repair should one of the drive belts on the engine break. In such an instance, linear segment of belt 11 would be emplaced on pulleys 14 and 15, as depicted in FIG. 1, removing any excess length so that the terminal butt ends of the belt can be drawn to juxtaposition 12, and forming coupling strip 13 by mating fastening elements 18 and 19.

To assist in bringing the terminal butt ends of the belt into juxtaposition 12, a tensioning tool may be employed. By way of exposition and not of limitation, the tensioning tool may take the form of clamping pliers 20 which are equipped with a pair of vise jaw clamps 21, each of which grasps a terminal end of belt 11. Squeezing the handles of pliers 20 draws the terminal butt ends of belt 11 together to juxtaposition 12, tensions the belt for operation, and permits the ready mating of fastening elements 18 and 19 to form coupling strip 13 which maintains belt 11 in place on pulleys 14 and 15 when clamping pliers 20 are removed.

The invention is also conceived to lend itself to the instance in which one or more dedicated, endless drive belts are stored near an automotive engine as spare belts. These belts are then available to replace worn or broken belts. However, the replacement of an endless belt can be bothersome even when one has the time, tools and facilities to do so. When the vehicle is stalled on the road. it may be impossible as well as inconvenient to replace an endless, drive belt.

To meet the needs arising in the latter situation, The invention provides bonding medium 17, and fastening elements 18 and 19. These are stored with the spare drive belts. When an emergency situation arises, and repair must be made on the road, under adverse conditions, or the like, The appropriate spare belt may be removed from storage, cut so as to convert it from an endless belt to a linear belt segment (11), and the fastening elements 18 and 19 bonded to the respective terminal ends of the linear segment using bonding medium 17.

When the bond has set (engine heat might be utilized to hasten the bonding process), The emergency drive belt is installed using clamping pliers 20, or the like, in the manner earlier disclosed.

Figure 4A:
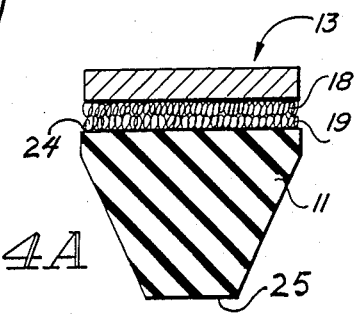
FIG. 4A is a cross sectional view of the emergency fan belt taken along lines 4A—4A of FIG. 1.

FIG. 4A is a cross sectional view taken along lines 4A—4A of FIG. 1. This illustrates the mating of fastening elements 18 and 19 to form coupling strip 13. In certain instances, because of the load placed on a drive belt by a particular engine or device, it may be desirable to increase the area over which coupling of the belt ends is accomplished. The addition of coupling strip 22 to the interior surface 25 of belt 11, as indicated in FIG. 4B, achieves this desired result.

Figure 4B:
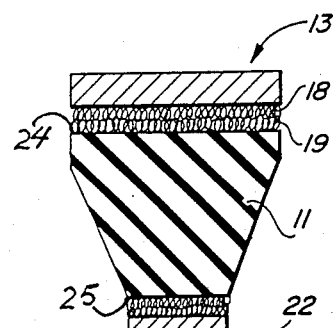
FIG. 4B is the same as FIG. 4A, but includes an additional coupling strip on the lower surface of the belt, as depicted.

FIG. 4B is a cross sectional view taken along the same lines as was FIG. 4A, but looking in the opposite direction. This is done to emphasize that "hook" element 19 may be affixed to belt 11 at each of the terminal ends of the belt. A length of "loop" fastener element 18, not nominally affixed to belt 11, is coupled across juxtaposition 12, as illustrated in FIG. 1, to complete the assembly of coupling strip 13 and maintain the terminal butt ends of belt 11 in close juxtaposition.

Figure 5:
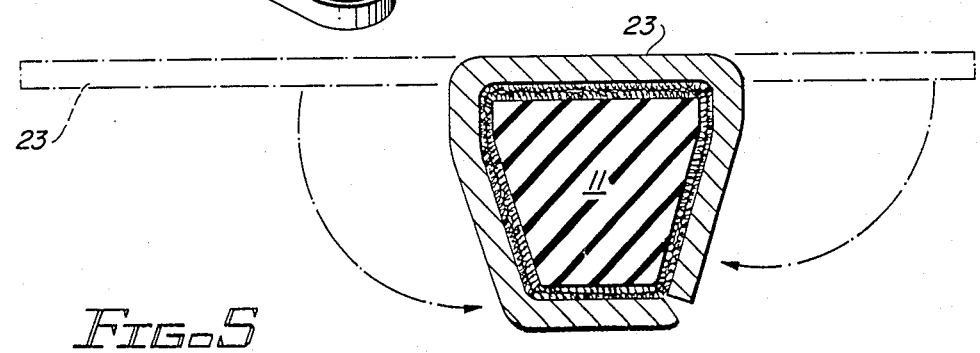
FIG. 5 illustrates the manner in which the coupling strip may be applied to all preipheral surfaces of the belt to increase the strength of the coupled belt assembly.

To provide the maximum coupling area, the surround arrangement of FIG. 5 is offered wherein a coupling strip 23 is coupled to all the peripheral surfaces of belt 11 adjacent to juxtaposition 12.

What has been disclosed is apparatus and method for effecting temporary, emergency repairs of an engine when a drive belt breaks and repairs must be made under adverse conditions. Either a linear belt segment or a conventional endless belt may be utilized for the emergency repair. A coupling strip maintains terminal ends of the emergency replacement belt juxtaposed and in close proximity.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. The method for making an emergency drive belt installation on an engine comprising the steps of:
   (a) bonding a first mating type coupling element adjacent a first terminal butt end of a linear segment of drive belting;
   (b) bonding a second mating type coupling element adjacent a second terminal butt end of said linear segment of drive belting;
   (c) threading said linear segment of drive belting around the appropriate engine pulleys;
   (d) drawing said first and second terminal butt ends of said linear segment together in butting juxtaposition; and,
   (e) coupling said first and said second coupling elements to maintain said first and second terminal butt ends in butting jaxtaposition forming an endless drive belt.

2. The method of claim 1 further comprising the step of:
   cutting an available, endless drive belt to provide a linear segment having two terminal ends for use in steps (a) and (b).

3. The method of claim 1 further comprising the step of:
   selecting the mating type coupling elements of steps (a) and (b) to be fastening elements of a hook and loop fastening assembly.

4. The method of claim 2 further comprising the step of:
   selecting the mating type coupling elements of steps (a) and (b) to be fastening elements of a hook and loop fastening assembly.

5. The method of claim 3 further comprising the step of:
   performing steps (a) and (b) at a commercial manufacturing facility.

6. The method of claim 4 further comprising the step of:
   performing steps (a) and (b) at the site of the emergency drive belt installation.

7. The product produced by the practice of the method of claim 1.

8. The product produced by the practice of the method of claim 2.

9. The product produced by the practice of the method of claim 3.

10. The product produced by the practice of the method of claim 4.

11. The product produced by the practice of the method of claim 5.

12. The product produced by the practice of the method of claim 6.

13. Means for assembly an emergency drive belt comprising:
   a first mating type coupling element bondable adjacent a first terminal butt and of a drive belt segment;
   a second mating type coupling element bondable adjacent a second terminal butt end of a drive belt segment; and,
   bonding medium for bonding said first and second mating type coupling elements adjacent first and second terminal butt ends, respectively, of a drive belt segment.

14. The means of claim 13 wherein said first and said second mating type coupling elements comprise mating elements of a hook and loop fastening assembly.

15. The means of claim 14 further comprising a linear segment of drive belting having two terminal butt ends for bondable coupling to said first and second mating type coupling elements.

16. The means of claim 14 further comprising a commercially available endless drive belt cut to provide two terminal butt ends for bondable coupling to said first and second mating type coupling elements.

17. The means of claim 13 further comprising a tensioning tool for grasping and drawing each of the terminal butt ends of a drive belt segment into butting juxtaposition while said first and second mating coupling elements are coupled.

18. The means of claim 14 further comprising a tensioning tool for grasping and drawing each of the terminal butt ends of a drive belt segment into butting juxtaposition while said first and second mating coupling elements are coupled.

19. The means of claim 15 further comprising a tensioning tool for grasping and drawing each of the terminal butt ends of a drive belt segment into butting juxtaposition while said first and second mating coupling elements are coupled.

20. The means of claim 16 further comprising a tensioning tool for grasping and drawing each of the terminal ends butt of a drive belt segment into butting juxtaposition while said first and second mating coupling elements are coupled.

* * * * *